United States Patent
Jia

(10) Patent No.: US 11,681,351 B2
(45) Date of Patent: Jun. 20, 2023

(54) METHOD AND DEVICE FOR CONTROLLING SCREEN, AND STORAGE MEDIUM

(71) Applicant: BEIJING XIAOMI MOBILE SOFTWARE CO., LTD., Beijing (CN)

(72) Inventor: Yongqiang Jia, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 56 days.

(21) Appl. No.: 17/386,303

(22) Filed: Jul. 27, 2021

(65) Prior Publication Data
US 2022/0300060 A1 Sep. 22, 2022

(30) Foreign Application Priority Data
Mar. 16, 2021 (CN) .......................... 202110281300.1

(51) Int. Cl.
G06F 3/041 (2006.01)
G06F 1/3234 (2019.01)
G06F 1/3206 (2019.01)
G06F 9/50 (2006.01)

(52) U.S. Cl.
CPC .......... *G06F 1/3265* (2013.01); *G06F 1/3206* (2013.01); *G06F 9/5055* (2013.01); *G06F 9/5083* (2013.01); *G06F 9/5094* (2013.01)

(58) Field of Classification Search
None
See application file for complete search history.

(56) References Cited

U.S. PATENT DOCUMENTS

| | | |
|---|---|---|
| 2010/0045621 A1* | 2/2010 | Kang .................... G06F 3/0486 345/173 |
| 2010/0328331 A1 | 12/2010 | Iwaki et al. |
| 2015/0116364 A1 | 4/2015 | Aurongzeb et al. |
| 2020/0228641 A1* | 7/2020 | Chen ........................ G06F 9/451 |

OTHER PUBLICATIONS

Extended European Search Report in European Application No. 21188245.1, dated Jan. 27, 2022, (9p).

* cited by examiner

*Primary Examiner* — Carl Adams
(74) *Attorney, Agent, or Firm* — Arch & Lake LLP

(57) ABSTRACT

A touch operation applied to one of N touch screens in a screen-on state is detected. Touch time of the touch operation is recorded. N is a positive integer greater than or equal to 2. It is determined, based on a touch time of one last touch operation detected on an n-th touch screen of the N touch screens, whether a duration of no touch operation being detected on the n-th touch screen reaches a preset duration. Here, n is a positive integer less than or equal to N. When the duration of no touch operation being detected on the n-th touch screen reaches the preset duration, the n-th touch screen is controlled to enter a screen-off state.

17 Claims, 6 Drawing Sheets

---

S101, a touch operation applied to one of N touch screens in a screen-on state is detected. Touch time of the touch operation is recorded. The N is a positive integer greater than or equal to 2

↓

S102, it is determined, based on a touch time of one last touch operation detected on an n-th touch screen of the N touch screens, whether a duration in which no touch operation has been detected on the n-th touch screen reaches a preset duration. The n is a positive integer less than or equal to the N

↓

S103, when the duration in which no touch operation has been detected on the n-th touch screen reaches the preset duration, the n-th touch screen is controlled to enter a screen-off state unfolded — half-folded — folded front — back

METHOD AND DEVICE FOR CONTROLLING SCREEN, AND STORAGE MEDIUM

CROSS-REFERENCE TO RELATED APPLICATION

This application claims the benefit of priority to Chinese Application No. 202110281300.1 filed on Mar. 16, 2021, the content of which is incorporated herein by reference in its entirety for all purposes.

TECHNICAL FIELD

The present disclosure relates to the field of control technology, and more particularly, to a method and device for controlling a screen, and a storage medium.

BACKGROUND

In an existing operating system, each time a user interacts with terminal equipment, the system records a time point at which the interaction occurs, and uses the time point in various subsequent state strategies, such as automatic screen-off. A principle for implementing automatic screen-off is to take the last time of interaction with a user as a starting point, and to automatically turn off a screen after reaching a set automatic screen-off time. There are some other system improving functions that are closely related to the user interaction time.

SUMMARY

The present disclosure provides a method and device for controlling a screen, and a storage medium.

According to a first aspect of the present disclosure, a method for controlling a screen is provided. The method includes: detecting a touch operation applied to one of N touch screens in a screen-on state, and recording touch time of the touch operation, wherein the N is a positive integer greater than or equal to 2; determining, based on a touch time of one last touch operation detected on an n-th touch screen of the N touch screens, whether a duration of no touch operation being detected on the n-th touch screen reaches a preset duration, wherein the n is a positive integer less than or equal to the N; and in response to determining that the duration of no touch operation being detected on the n-th touch screen reaches the preset duration, controlling the n-th touch screen to enter a screen-off state.

According to a second aspect of the present disclosure, a device for controlling a screen is provided, including: a processor; and a memory configured to store executable instructions executable on the processor, wherein the processor is configured to execute the executable instructions to implement: detecting a touch operation applied to one of N touch screens in a screen-on state, and recording touch time of the touch operation, wherein the N is a positive integer greater than or equal to 2; determining, based on a touch time of one last touch operation detected on an n-th touch screen of the N touch screens, whether a duration of no touch operation being detected on the n-th touch screen reaches a preset duration, wherein the n is a positive integer less than or equal to the N; and in response to determining that the duration of no touch operation being detected on the n-th touch screen reaches the preset duration, controlling the n-th touch screen to enter a screen-off state.

According to a third aspect of the present disclosure, there is provided a non-transitory computer-readable storage medium storing computer-executable instructions which, when executed by a processor, implement: detecting a touch operation applied to one of N touch screens in a screen-on state, and recording touch time of the touch operation, wherein the N is a positive integer greater than or equal to 2; determining, based on a touch time of one last touch operation detected on an n-th touch screen of the N touch screens, whether a duration of no touch operation being detected on the n-th touch screen reaches a preset duration, wherein the n is a positive integer less than or equal to the N; and in response to determining that the duration of no touch operation being detected on the n-th touch screen reaches the preset duration, controlling the n-th touch screen to enter a screen-off state.

It should be understood that the general description above and the detailed description below are illustrative and explanatory, and do not limit the present disclosure.

BRIEF DESCRIPTION OF THE DRAWINGS

The accompanying drawings, which are incorporated in and form a part of this specification, illustrate examples consistent with the present disclosure and, together with the description, serve to explain the principles of the present disclosure.

DETAILED DESCRIPTION

Figure 1:
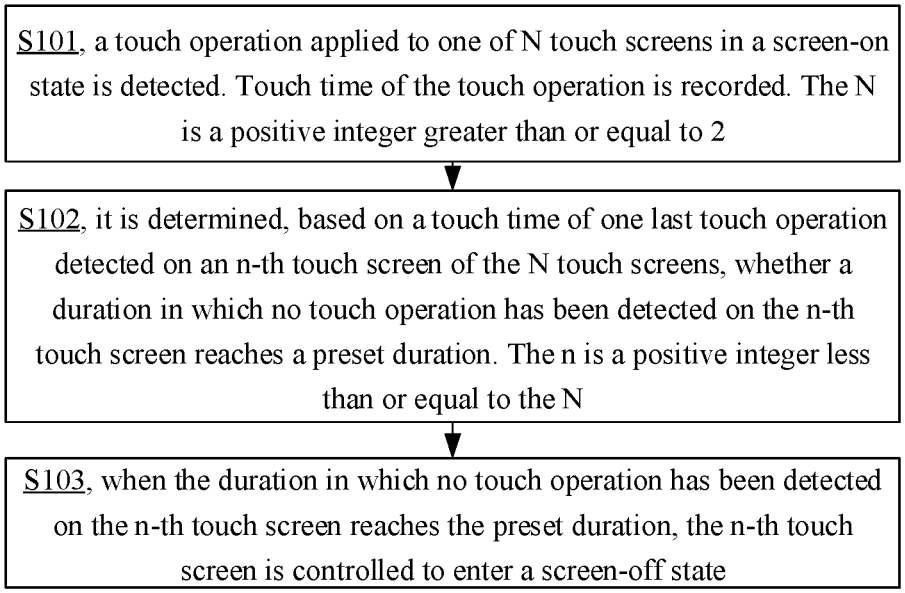
FIG. 1 is a flowchart of a method for controlling a screen according to one or more examples of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

In an existing operating system, each time a user interacts with terminal equipment, the system records a time point at which the interaction occurs, and uses the time point in various subsequent state strategies, such as automatic screen-off. A principle for implementing automatic screen-off is to take the last time of interaction with a user as a starting point, and to automatically turn off a screen after reaching a set automatic screen-off time. As another example, with an existing power-saving mechanism, a series of power-saving strategies will begin after the user turns off the screen, and stops interacting with the system for more than 30 minutes. There are some other system improving functions that are closely related to the user interaction time. However, on multi-screen equipment, with the control method described above, good power consumption saving performance fails to be achieved.

Examples of the present disclosure provide a method for controlling a screen. FIG. 1 is a flowchart of a method for controlling a screen according to an illustrative example. As shown in FIG. 1, the method for controlling a screen includes steps as follows.

In S101, a touch operation applied to one of N touch screens in a screen-on state is detected. Touch time of the touch operation is recorded. The N is a positive integer greater than or equal to 2.

In S102, it is determined, based on a touch time of one last touch operation detected on an n-th touch screen of the N touch screens, whether a duration in which no touch operation has been detected on the n-th touch screen reaches a preset duration. The n is a positive integer less than or equal to the N.

In S103, when the duration in which no touch operation has been detected on the n-th touch screen reaches the preset duration, the n-th touch screen is controlled to enter a screen-off state.

It should be noted that the method for controlling a screen may be applied to any terminal equipment having a touch screen. The terminal equipment may be a smartphone, a tablet computer, a wearable electronic device, etc.

It should also be noted that the terminal equipment of the present disclosure has a plurality of touch screens. The plurality of touch screens can trigger a function corresponding to a touch operation after the touch operation has been detected. A touch operation here may be a touch trigger operation on a touch screen. In some possible examples, the touch operation includes an operation such as a click, a double click, a long press, a slide, etc., on a touch screen.

A touch screen of the present disclosure may be provided with an automatic screen-off function. When the touch screen is in a screen-on state, if a touch operation is detected within a preset duration, the touch screen may remain in the screen-on state, and a function triggered by the touch operation may be executed. When the touch screen is in the screen-on state, if no touch operation is detected within a preset duration that follows, the touch screen may automatically enter the screen-off state to save power consumption.

The preset duration may be an automatic screen-off duration preset on terminal equipment. In some possible examples, the preset duration may be determined by counting a use habit of a user. For example, the preset duration is determined by counting a duration of browsing a page, a frequency of click by a user, etc. It may be determined when a screen is to be turned off automatically, by comparing the preset duration to an interval from touch time of the last touch operation detected on a touch screen to present time.

When no touch operation is detected within a preset duration after an X-th touch operation has been detected on the n-th touch screen, the X-th touch operation is the last touch operation detected on the n-th touch screen. The X is a positive integer greater than or equal to 1. Here, it is possible to determine, according to a difference (i.e., an interval) between the touch time of the last touch operation detected on a touch screen and the present time, whether the duration in which no touch operation is detected on the touch screen reaches the preset duration.

Here, such time of a touch operation is a time point at which the touch operation is detected. For example, if a touch operation is detected on a first touch screen at 15:01, the touch time is 15:01.

It should be noted that in other examples, if the duration in which no touch operation has been detected on the n-th touch screen does not reach the preset duration, the n-th touch screen may be kept in the screen-on state. That is, any other touch screen that has not met the condition of entering the screen-on state cannot enter the screen-on state, and remains in the screen-on state. In this way, at a detection time point, there may be some touch screens that have entered the screen-off state, and the other remain in the screen-off state, rather than all being in a uniform mode, increasing flexibility in control.

As a possible example, it is assumed that terminal equipment has two touch screens, and the preset duration is 1 minute. If a touch operation is detected on the first touch screen at 15:01, then subsequently if no touch operation is detected on the first touch screen between 15:01 and 15:02, the duration in which no touch operation is detected on the first touch screen reaches the preset duration. In this case, the first touch screen may enter the screen-off state. If a touch operation is detected on the second touch screen at 15:01, however subsequently a touch operation is detected at 15:01:30, then the duration in which no touch operation is detected on the second touch screen does not reach the preset duration. Then, the second touch screen will not enter the screen-holding state, but remains in the screen-on state.

In this way, with the present disclosure, the duration between touch operations may be computed respectively for each touch screen by respectively detecting touch operations on the N touch screens in the screen-on state and recording touch time corresponding to respective touch operations, isolating time of user interaction on multiple screens, such that different screens are turned off separately based respectively on touch time corresponding to the respective screens, improving system performance, reducing unnecessary power consumption, improving endurance of terminal equipment.

In some examples, in order to better record touch time on a touch screen, an automatic processing flow capable of setting identification information corresponding to respective touch screens is formed to refer respective touch screens by the identification information. Identification information of a touch screen may be alphabetic information, numeric information, symbolic information, information on a combination of the alphabetic information, the numeric information, and the symbolic information, etc. Thus, after a touch operation has been detected based on a sensing module in a detecting module of a touch screen, identification information of the touch screen that has been touched may be determined first. The touch operation may be reported to a power managing module in the terminal equipment according to the identification information. The power managing module may send, according to the identification information acquired, updated touch time corresponding to the touch operation to the touch screen corresponding to the identification information. In this way, correspondence between identification information of a touch screen and touch time may be established. It may be understood that touch time corresponding to a touch screen may be determined based on the correspondence between identification information and touch time.

Here, after a touch screen has been provided with identification information corresponding to the touch screen, the touch time of the touch operation may be recorded as follows. Touch time of touch operations applied respectively to the N touch screens may be recorded according to identification information of the N touch screens.

For example, assuming that there are two touch screens on terminal equipment. Identification information corresponding to a first touch screen may be A. Identification information corresponding to a second touch screen may be B. If a touch operation is detected on the first touch screen at 10:30, the touch operation may be reported to a power managing module in the terminal equipment according to the identification information A. The power managing module may send the updated touch time 10:30 corresponding to the touch operation to the first touch screen corresponding to the identification information A acquired. Then, established correspondence between identification information of a touch screen and touch time may be that A corresponds to 10:30. Touch time may then be recorded in form of the correspondence.

In another example, it is also possible to determine, according to a relation of connection between a touch screen and a processing module in terminal equipment, a touch screen that has reported no touch operation within a preset duration.

That is, since different touch screens and processing modules are connected based on different connection lines, touch screens may be distinguished based directly on different connection lines. In this mode, no identification information has to be provided for a touch screen, reducing some setting flows.

Here, when a touch operation occurs on a touch screen, the touch may be detected and reported. In this case, data involved in the reporting flow is delivered to a processing module in terminal equipment based on a connection line. Then, with the present disclosure, a connection line having touch data to be transmitted may be distinguished based directly on data delivered on the connection line. Then, after the connection line has been determined, a touch screen on which the touch operation occurs may be determined based on a relation of connection, so as to distinguish the touch screen.

In still other examples, based on the identification information, when the duration in which no touch operation has been detected on the n-th touch screen reaches the preset duration, the n-th touch screen may be controlled to enter the screen-off state, as follows.

When the duration in which no touch operation has been detected on the n-th touch screen reaches the preset duration, a screen control instruction may be generated according to identification information of the n-th touch screen.

The n-th touch screen may be controlled to enter the screen-off state according to the screen control instruction.

Here, the screen control instruction may include identification information of a touch screen to which a screen operation is applied, and operation information corresponding to the identification information. When the duration in which no touch operation has been detected on the n-th touch screen reaches the preset duration, it means that a condition for the n-th touch screen to enter the screen-off state has been met. In this case, a screen control instruction may be generated based on the identification information of the n-th touch screen, and the n-th touch screen may be turned off via the screen control instruction.

In some examples, in an automatic screen-off control program of terminal equipment, when a touch screen in the screen-off state is triggered to enter the screen-on state, a picture being displayed on the touch screen is a picture used to be displayed before the screen entering the screen-off state. For example, a chat page of an application A is displayed on a touch screen right before the touch screen enters the screen-off state. Then, the chat page of the application A is still displayed on the touch screen when it is detected that the touch operation enters the screen-on state again after entering the screen-off state. In this way, with the present disclosure, an application running on a touch screen before the touch screen enters the screen-off state may be determined. An operation such as an above-mentioned scree-on display operation or a resource release operation may be performed based on the application determined.

A scree-on display operation is a display operation performed when detecting a touch operation and entering the screen-on state again after entering the screen-off state, corresponding to the above-mentioned restoration restore of display of the chat page of the application A.

A resource release operation is an operation of releasing a resource occupied by an application displayed before entering the screen-off state. A touch screen entering the screen-off state by default is not being used by a user. In this case, if a resource of an application corresponding to the touch screen continues to be occupied, it may increase unnecessary power consumption, and system performance will be degraded due to excessive system resource occupation. In view of this, the present disclosure proposes to release a resource occupied by an application running before entering the screen-off state, to save system resources and improve system performance.

Figure 2:
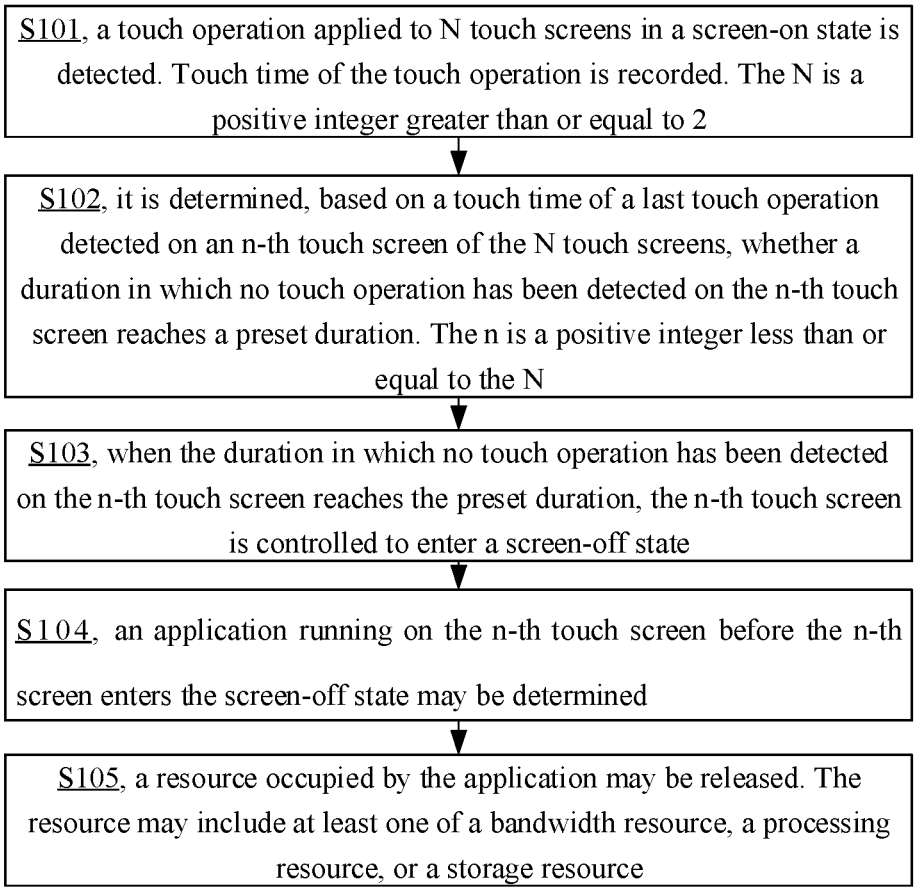
FIG. 2 is a flowchart of a method for controlling a screen according to one or more examples of the present disclosure.

Illustratively, to perform a resource release operation, FIG. 2 is a flowchart of a method for controlling a screen according to an illustrative example. As shown in FIG. 2, the method may further include a step as follows.

In S104, an application running on the n-th touch screen before the n-th screen enters the screen-off state may be determined.

In S105, a resource occupied by the application may be released. The resource may include at least one of a bandwidth resource, a processing resource, or a storage resource.

Here, an application running on a touch screen before the screen enters the screen-off state may be determined by setting a monitoring program. That is, the state of the touch screen may be monitored. When it is monitored that the touch screen changes from the screen-on state to the screen-off state, an application identifier of an application running on the touch screen may be acquired. The application running on the touch screen before the touch screen enters the screen-off state may be determined based on the application identifier.

After an application running on a touch screen before the touch screen enters the screen-off state has been determined, a resource occupied may be released. As a specific example, it is assumed that there are two touch screens on terminal equipment. Assume that the present time is 10:30 and the preset duration is 1 minute. When the touch time of the last touch operation detected on the first touch screen is 10:28, and a chat page of an application A is displayed after the last touch operation, the first touch screen has entered the screen-off state by the present time. When the touch time of the last touch operation detected on the second touch screen is 10:29:30, and a video playing page of an application B is displayed after the last touch operation, the second touch screen is still in the screen-on state at present. Thus, at the present time, the touch screen on the terminal equipment that has entered the screen-off state is the first touch screen, and the application running on the first touch screen before the first touch screen enters the screen-off state is the application A. Here, as the first touch screen has entered the screen-off state, if a user is not using the first touch screen, a resource occupied by the application A may be released.

Here, a resource occupied by an application may include a bandwidth resource, a processing resource, and/or a storage resource.

A bandwidth resource may be a bandwidth resource of a transmission bus within terminal equipment, etc. Here, since a bandwidth resource of a system is definite, when a bandwidth resource corresponding to an application A has been released, a bandwidth resource available for an application running on another touch screen may increase accordingly, ensuring a speed of running an application on another touch screen.

A processing resource may include at least a resource with processing capability represented by a central processing unit (CPU).

A storage resource may include at least memory, a disk, a bandwidth resource involved in input/output, and/or a resource involved in file loading.

Since it is emphasized to release different resources for different applications, taking a video application as an example, at least a bandwidth resource may be occupied during video playback. Then, if an application running before entering the screen-off state is a video application, a bandwidth resource being occupied at present may be released. Thus, in some examples, resource release may be performed according to the type of the application.

Resource release may be elaborated below.

Figure 3:
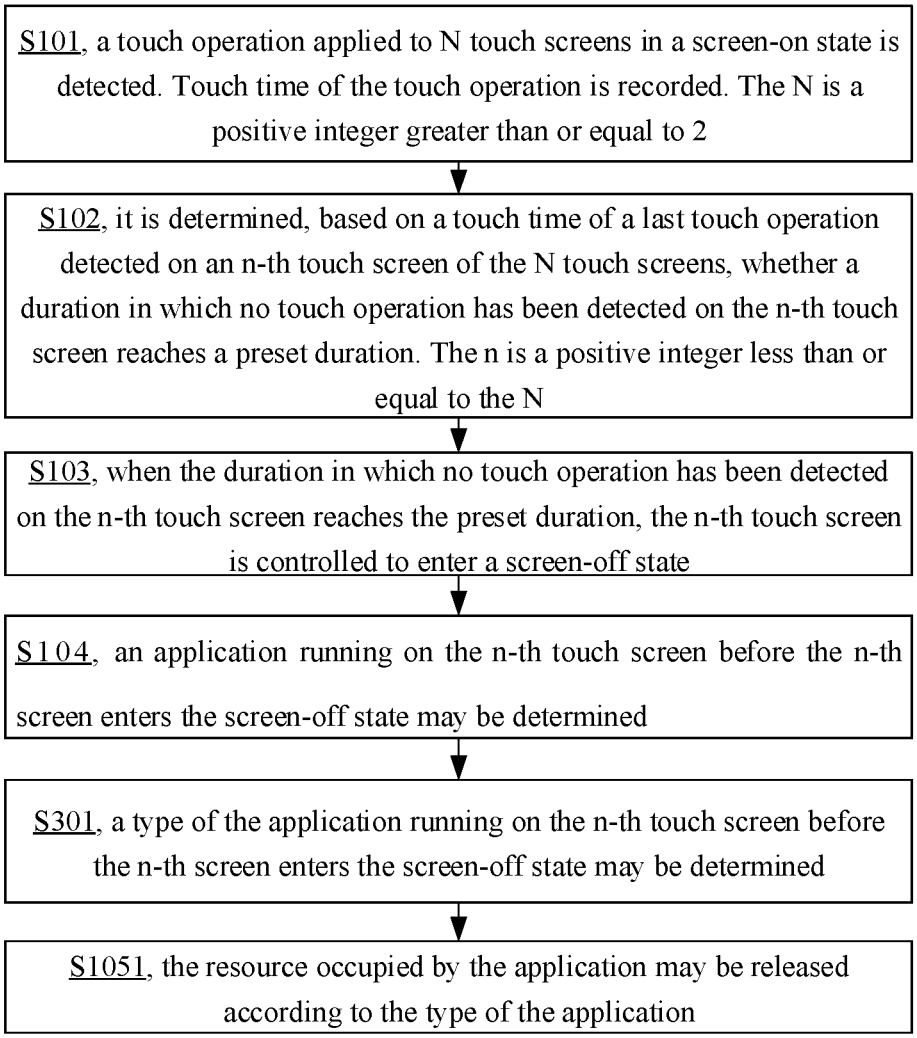
FIG. 3 is a flowchart of a method for controlling a screen according to one or more examples of the present disclosure.

In some examples, FIG. 3 is a flowchart of a method for controlling a screen according to an illustrative example. As shown in FIG. 3, the method may further include a step as follows.

In S301, a type of the application running on the n-th touch screen before the n-th screen enters the screen-off state may be determined.

Here, an application may be a video application, a communication application, an information application, a photographing application, a data processing application, a document processing application, etc. In implementation of the present disclosure, the type of an application may be determined according to a classification number identified by the application. Different classification numbers correspond to different types of applications.

After a type of an application running before entering the screen-off state has been determined (S301), in S105, a resource occupied by the application may be released as follows.

In S1051, the resource occupied by the application may be released according to the type of the application.

As described above, there are different emphases of resource release for different types of applications. Then, when a resource is to be released for an application, a release strategy may be determined for the application according to the type of the application, and resource release may be performed based on the release strategy corresponding to the application, achieving targeted release, reducing run confusion caused by release for all applications according to the same release strategy.

Here, in some examples, since applications of the same type may have similar resource requirements, the same release strategy may be determined for the applications of the same type. For example, all video applications may correspond to a release strategy A, so that more targeted release more suitable for a feature of running a type of applications is performed, with better practicability.

In other examples, the same release strategy may also be set for different types of applications with the same or similar requirements on resource use. For example, since both video applications and netdisc applications have video playback and buffering functions, then in video processing, resource release may be performed using the same release strategy for both types of applications. In this way, the need for targeted release may also be achieved, which is not limited to the present disclosure.

When a touch screen is triggered to enter the screen-on state again after entering the screen-off state, a picture displayed on the touch screen right before the touch screen enters the screen-off state may again be displayed on the touch screen. Then, if all resources are released corresponding to an application running at present, when it is triggered to enter the screen-on state again after entering the screen-off state, an original running interface cannot be subsequently restored normally for the application. Thus, targeted release may be performed according to the type of the application.

Here, taking an application of a first type having a resource downloading function and an application of a second type having a computing function as examples, a resource occupied by an application may be released as follows.

Illustratively, a video application may occupy a bandwidth resource in playback, and a video, if downloaded, may also occupy a storage resource. A data processing application may perform data processing at runtime, and may occupy at least a processing resource, and may occupy a storage resource and a bandwidth resource in a few cases. However, a data processing application may occupy a processing resource just when interacting with a user. In this case, if a data processing application runs right before screen-off, a processing resource corresponding to the data processing application is actually idle due to none interaction with the user after screen-off. In this case, at least an occupied processing resource may be released.

Specifically, for an application of a first type having a resource download function, the resource occupied by the application may be released according to the type of the application as follows.

When the type of the application is the first type, and the application of the first type is in a resource download state, the storage resource and the bandwidth resource of the application of the first type may be retained, and the processing resource of the application of the first type may be released.

Here, an application of the first type may be a video application or a netdisc application, etc.

By an application of the first type being in a resource download state, it means that the application of the first type is in a video download state at the time.

Since in video download, a resource on a network is downloaded to the local, the application of the first type may occupy certain bandwidth resources, and may also occupy certain storage resources in the cache before local storage. Then, when an application of the first type is in a resource download state before entering the screen-off state, then after automatically entering the screen-off state, all of these resources may be released to save power consumption.

However, it should be noted that an application may download a video in the background. That is, in some examples, even if a touch screen enters the screen-off state, if a download task is triggered before screen-off, download may continue after screen-off. That is, the video download application applies for a WakeLock function.

A WakeLock function may prevent a download task from being suspended, in which case the system cannot go to sleep. Then, even in the screen-off state, the task to be performed by the application will not be interrupted, and the download will continue. The system does not go to sleep until the WakeLock function applied by the application is released. In this case in the screen-off state, all resources of the application may be released, the download task may be suspended, and the download may stop. However, if a WakeLock function is released, the download task will stop. In this case, user experience will be poor, which is not conducive to the download flow. Thus, if an application of a first type triggers a download task before screen-off, resource release processing may be performed for the application also as follows. A storage resource and a bandwidth resource of the application of the first type may be retained, and a processing resource of the application of the first type may be released, reducing occurrence of download stop due to resource release.

For an application of a second type having a computing function, the resource occupied by the application may be released according to the type of the application as follows.

When the type of the application is the second type, the bandwidth resource, the processing resource, and the storage resource of the application of the second type may be released.

Here, an application of the second type may be a data processing application, such as a computer or a range finder, etc.

An application of the second type mainly occupies a processing resource. Illustratively, when interacting with a user, data input by the user are received. The data may be processed to acquire a result (Specifically, the user inputs data to be computed to perform computation). However, when not interacting with a user, a processing resource corresponding to the application may be in an idle state, and may be released.

For such an application with a computing function, since there is little external data exchange (introduction of data downloaded online for processing), release of a storage resource and a bandwidth resource will not affect recovery of the application of the second type after subsequent screen-on, and then all three resources may be released.

It should be noted that for such an application of the second type having a computing function, a bandwidth resource may be involved since the application interacts with external data. For a storage resource, data processing may be real-time or online. However, in either case, with the present disclosure, the bandwidth resource and the storage resource are not released to minimize impact on subsequent screen-on recovery and background processing. Therefore, in some examples, it is possible to release just the processing resource of a second-type application.

In some examples, a resource corresponding to a touch screen may be labeled in advance according to different touch screens. A resource occupied by an application running right before screen-off may be released based directly on the label. Thus, the method may further include a step as follows.

The resource occupied by the application running on the n-th touch screen before the n-th screen enters the screen-off state may be labeled according to the identification information of the n-th touch screen.

The resource occupied by the application may be released as follows.

The resource that has been labeled may be released.

Here, when terminal equipment has a plurality of touch screens, different resources may be allocated to different touch screens in order that the plurality of touch screens can perform synchronized processing and ensure smooth processing. For example, assume that there are two processors CPU0 and CPU1 in the system. When applications are running simultaneously on the plurality of touch screens, with an application A running on the first touch screen and an application B running on the second touch screen, processing resource allocation may be performed according to different types of applications. For example, assuming that the application A needs a faster processing speed, CPU0 may be allocated to A, and CPU1 may be allocated to B. The processing speed of CPU0 may be higher than the processing speed of B.

Then, before automatic screen-off operation is performed, a resource may be allocated to an application on a touch screen according to a type of the application running on the touch screen, and the resource allocated may be labeled. By the label, when performing resource release, it may be determined which resource is to be released and which resource is not to be released. That is, a resource containing the label may be released, and a resource not containing the label is not be released. When resource allocation is complete and processing is performed accordingly, if no touch operation is detected on a touch screen within a preset time period, the touch screen may enter the screen-off state, and a resource corresponding to an application running on the touch screen before screen-off may be released according to the label.

In this way, in processing, a resource release operation may be performed based on a label detected, implementing automatic resource release, reducing an issue of resource division during subsequent resource release, increasing a processing speed in resource release.

Figure 4:
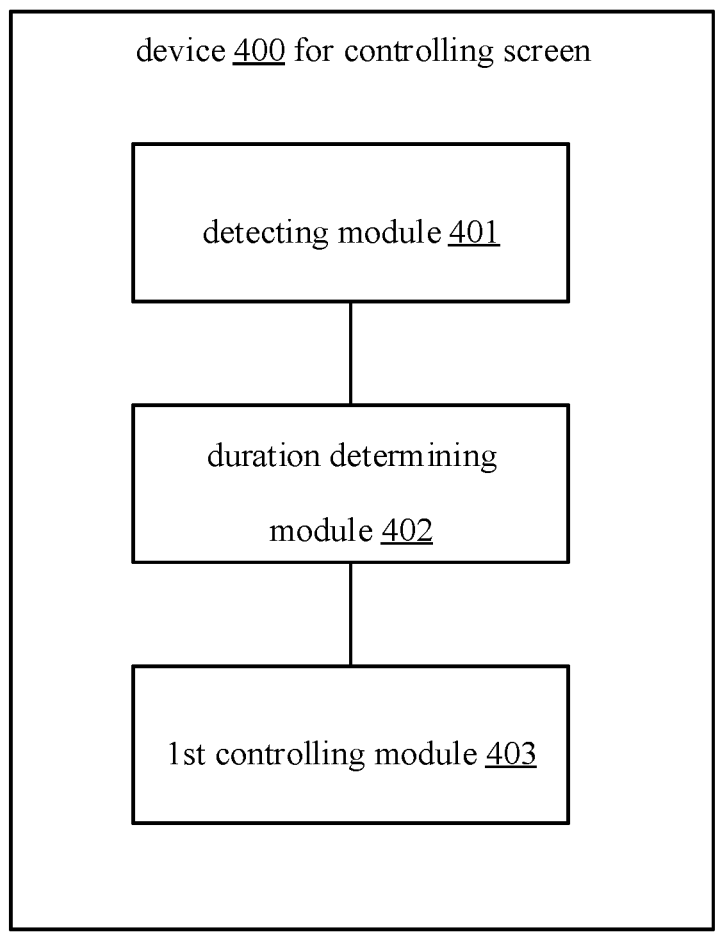
FIG. 4 is a diagram of a structure of a device for controlling a screen according to one or more examples of the present disclosure.

The present disclosure further provides a device for controlling a screen. FIG. 4 is a diagram of a structure of a device for controlling a screen according to an illustrative example. As shown in FIG. 4, the device 400 for controlling a screen includes a detecting module, a duration determining module, and a first controlling module.

The detecting module 401 is configured to detect a touch operation applied to one of N touch screens in a screen-on state, and record touch time of the touch operation. The N is a positive integer greater than or equal to 2.

The duration determining module 402 is configured to determine, based on a touch time of one last touch operation detected on an n-th touch screen of the N touch screens, whether a duration in which no touch operation has been detected on the n-th touch screen reaches a preset duration. The n is a positive integer less than or equal to the N.

The first controlling module 403 is configured to, in response to the duration in which no touch operation has been detected on the n-th touch screen reaching the preset duration, control the n-th touch screen to enter a screen-off state.

In some examples, the device further includes an application determining module and a releasing module.

The application determining module is configured to determine an application running on the n-th touch screen before the n-th screen enters the screen-off state.

The releasing module is configured to release a resource occupied by the application. The resource may include at least one of a bandwidth resource, a processing resource, or a storage resource.

In some examples, the device further includes a type determining module.

The type determining module is configured to determine a type of the application running on the n-th touch screen before the n-th screen enters the screen-off state.

The releasing module may include a release processing unit.

The release processing unit is configured to release the resource occupied by the application according to the type of the application.

In some examples, the type of the application may include a first type having a resource download function.

The release processing unit is further configured to implement:

in response to the type of the application being the first type, and the application of the first type being in a resource download state, retaining the storage resource and the bandwidth resource of the application of the first type, and releasing the processing resource of the application of the first type.

In some examples, the type of the application may include a second type having a computing function.

The release processing unit is further configured to implement:

in response to the type of the application being the second type, releasing the bandwidth resource, the processing resource, and the storage resource of the application of the second type.

In some examples, the detecting module includes a recording module.

The recording module is configured to record touch time of touch operations applied respectively to the N touch screens according to identification information of the N touch screens.

The first controlling module may include an instruction generating unit and a screen controlling module.

The instruction generating unit is configured to, in response to the duration in which no touch operation has been detected on the n-th touch screen reaching the preset duration, generate a screen control instruction according to identification information of the n-th touch screen.

The screen controlling module is configured to control the n-th touch screen to enter the screen-off state according to the screen control instruction.

In some examples, the device further includes a labeling module.

The labeling module is configured to label, according to the identification information of the n-th touch screen, the resource occupied by the application running on the n-th touch screen before the n-th screen enters the screen-off state.

The releasing module is further configured to implement: releasing the resource that has been labeled.

In some examples, the device further includes a second controlling module.

The second controlling module is configured to, in response to the duration in which no touch operation has been detected on the n-th touch screen not reaching the preset duration, keep the n-th touch screen in the screen-on state.

A module of a device according to an aforementioned example may perform an operation in a mode elaborated in an example of a method herein, which will not be repeated here.

Figure 5A:
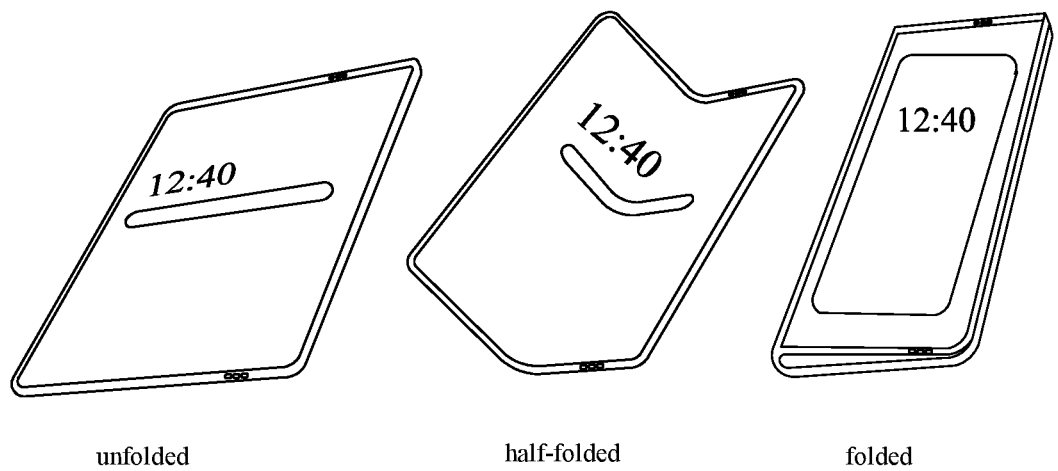
FIG. 5 is a block diagram of a device for controlling a screen according to one or more examples of the present disclosure.
Figure 5B:
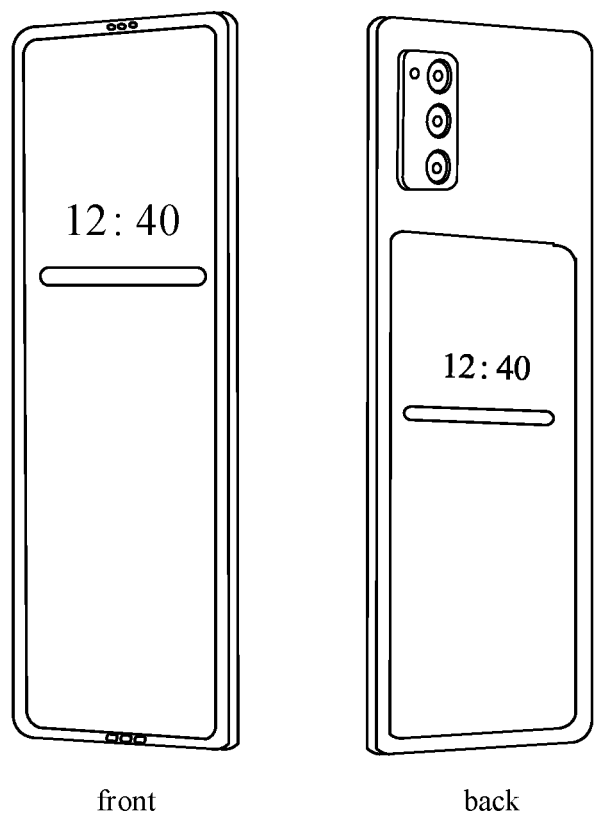

FIG. 5 is a block diagram of a device for controlling a screen according to one or more examples of the present disclosure. For example, FIG. 5A shows a multi-screen terminal with flexible display in an unfolded state, a half-folded state, and a folded state from left to right, respectively; and FIG. 5B shows the front view and the back view of a multi-screen terminal with double-sided display/screen.

Figure 6:
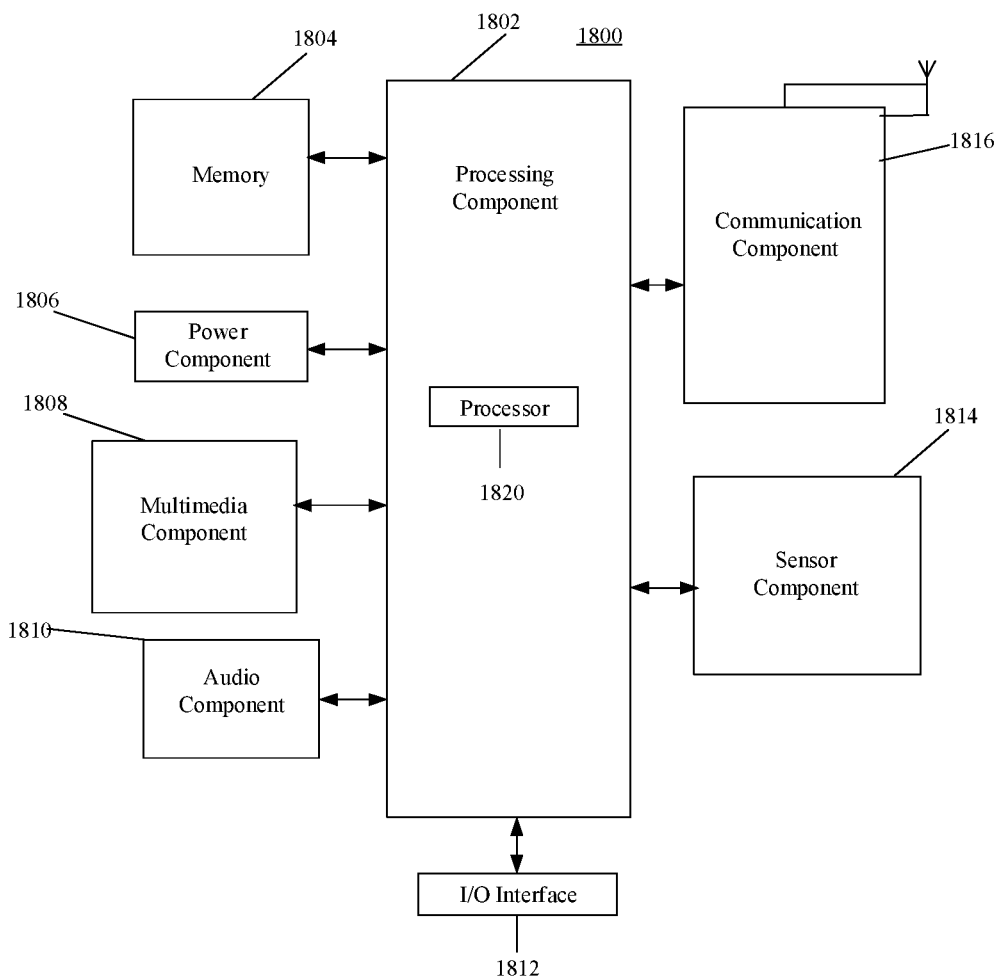
FIG. 6 is a block diagram of a device for controlling a screen according to one or more examples of the present disclosure.

FIG. 6 is a block diagram of a device for controlling a screen according to an illustrative example. For example, the device 1800 may be a mobile phone, a computer, a digital broadcasting terminal, a message transceiver, a game console, tablet equipment, medical equipment, fitness equipment, a Personal Digital Assistant (PDA), etc.

Referring to FIG. 6, the device 1800 may include one or more components as follows: a processing component 1802, a memory 1804, a power component 1806, a multimedia component 1808, an audio component 1810, an Input/Output (I/O) interface 1812, a sensor component 1814, and a communication component 1816.

The processing component 1802 generally controls an overall operation of the display equipment, such as operations associated with display, a telephone call, data communication, a camera operation, a recording operation, etc. The processing component 1802 may include one or more processors 1820 to execute instructions so as to complete all or some steps of the method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operation on the device 1800. Examples of these data include instructions of any application or method configured to operate on the device 1800, contact data, phonebook data, messages, images, videos, and/etc. The memory 1804 may be realized by any type of volatile or non-volatile storage equipment or combination of the volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 1806 supplies electric power to various components of the device 1800. The power component 1806 may include a power management system, one or more power supplies, and other components related to generating, managing and distributing electric power for the device 1800.

The multimedia component 1808 includes a screen providing an output interface between the device 1800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 1808 includes a front camera and/or a rear camera. When the device 1800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 1810 is configured to output and/or input an audio signal. For example, the audio component 1810 includes a microphone (MIC). When the device 1800 is in an operation mode such as a call mode, a recording mode, and a voice recognition mode, the MIC is configured to receive an external audio signal. The received audio signal may be further stored in the memory 1804 or may be sent via the communication component 1816. In some examples, the audio component 1810 further includes a loudspeaker configured to output the audio signal.

The I/O interface 1812 provides an interface between the processing component 1802 and a peripheral interface module. The peripheral interface module may be a keypad, a click wheel, a button, etc. These buttons may include but are not limited to: a homepage button, a volume button, a start button, and a lock button.

The sensor component 1814 includes one or more sensors for assessing various states of the device 1800. For example, the sensor component 1814 may detect an on/off state of the device 1800 and relative location of components such as the display and the keypad of the device 1800. The sensor component 1814 may further detect a change in the location of the device 1800 or of a component of the device 1800, whether there is contact between the device 1800 and a user, the orientation or acceleration/deceleration of the device 1800, and a change in the temperature of the device 1800. The sensor component 1814 may include a proximity sensor configured to detect existence of a nearby object without physical contact. The sensor component 1814 may further include an optical sensor such as a Complementary Metal-Oxide-Semiconductor (CMOS) or Charge-Coupled-Device (CCD) image sensor used in an imaging application. In some examples, the sensor component 1814 may further include an acceleration sensor, a gyroscope sensor, a magnetic sensor, a pressure sensor, or a temperature sensor.

The communication component 1816 is configured to facilitate wired or wireless/radio communication between the device 1800 and other equipment. The device 1800 may access a radio network based on a communication standard such as WiFi, 2G, 3G, . . . , or a combination of the any communication standard. In an illustrative example, the communication component 1816 broadcasts related information or receives a broadcast signal from an external broadcast management system via a broadcast channel. In an illustrative example, the communication component 1816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative example, the device 1800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative example, a non-transitory computer-readable storage medium including instructions, such as the memory 1804 including instructions, is further provided. The instructions may be executed by the processor 1820 of the device 1800 to implement an aforementioned method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A non-transitory computer-readable storage medium has stored instructions which, when executed by a processor, implement an aforementioned method.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited by the appended claims.

INDUSTRIAL APPLICABILITY

With the method for controlling a screen provided in examples of the present disclosure, for terminal equipment having a plurality of touch screens, a touch operation applied to one of N touch screens in a screen-on state is detected. Touch time is recorded. It is determined, based on a touch time of one last touch operation detected on a touch screen, whether to control the touch screen to enter a screen-off state. Thus, since there are a plurality of touch screens, if touch time on one touch screen is still used as time of interaction by a user with the touch screens, some touch screens that have reached a screen-off condition may not be able to enter the screen-off state, leading to unnecessary function consumption by the touch screen. Therefore, with the present disclosure, the duration between touch operations may be computed respectively for each touch screen by respectively detecting touch operations on the N touch screens in the screen-on state and recording touch time corresponding to respective touch operations, isolating time of user interaction on multiple screens, such that different screens are turned off separately based respectively on touch time corresponding to the respective screens, improving system performance, reducing unnecessary power consumption.

What is claimed is:

1. A method for controlling a screen, comprising:
    detecting a touch operation applied to one of N touch screens in a screen-on state, and recording touch time of the touch operation, wherein N is a positive integer greater than or equal to 2;
    determining, based on a touch time of one last touch operation detected on an n-th touch screen of the N touch screens, whether a duration of no touch operation being detected on the n-th touch screen reaches a preset duration, wherein n is a positive integer less than or equal to N;
    in response to determining that the duration of no touch operation being detected on the n-th touch screen reaches the preset duration, controlling the n-th touch screen to enter a screen-off state;
    determining an application running on the n-th touch screen before the n-th screen enters the screen-off state;
    releasing a resource occupied by the application; and
    determining a type of the application running on the n-th touch screen before the n-th screen enters the screen-off state,
    wherein releasing the resource occupied by the application comprises:
    releasing the resource occupied by the application according to the type of the application.

2. The method of claim 1,
    wherein the resource comprises at least one of a bandwidth resource, a processing resource, or a storage resource.

3. The method of claim 2, wherein the type of the application comprises a first type having a resource download function,
    wherein releasing the resource occupied by the application according to the type of the application comprises:
    in response to the type of the application being the first type, and the application of the first type being in a resource download state, retaining the storage resource and the bandwidth resource of the application of the first type, and releasing the processing resource of the application of the first type.

4. The method claim 2, wherein the type of the application comprises a second type having a computing function,
    wherein releasing the resource occupied by the application according to the type of the application comprises:
    in response to the type of the application being the second type, releasing the bandwidth resource, the processing resource, and the storage resource of the application of the second type.

5. The method claim 1, wherein recording the touch time of the touch operation comprises:
    recording touch time of touch operations applied to the N touch screens according to identification information of the N touch screens,
    wherein in response to determining that the duration of no touch operation being detected on the n-th touch screen reaches the preset duration, controlling the n-th touch screen to enter the screen-off state comprises:
    in response to determining that the duration of no touch operation being detected on the n-th touch screen reaches the preset duration, generating a screen control instruction according to identification information of the n-th touch screen; and controlling the n-th touch screen to enter the screen-off state according to the screen control instruction.

6. The method claim 5, further comprising:
labeling, according to the identification information of the n-th touch screen, the resource occupied by the application running on the n-th touch screen before the n-th screen enters the screen-off state,
wherein releasing the resource occupied by the application comprises:
releasing the resource that has been labeled.

7. The method of claim 1, further comprising:
in response to determining that the duration of no touch operation being detected on the n-th touch screen does not reach the preset duration, keeping the n-th touch screen in the screen-on state.

8. A device for controlling a screen, comprising:
a processor; and
a memory configured to store executable instructions executable on the processor, wherein the processor is configured to execute the executable instructions to implement acts comprising:
detecting a touch operation applied to one of N touch screens in a screen-on state, and recording touch time of the touch operation, wherein N is a positive integer greater than or equal to 2;
determining, based on a touch time of one last touch operation detected on an n-th touch screen of the N touch screens, whether a duration of no touch operation being detected on the n-th touch screen reaches a preset duration, wherein n is a positive integer less than or equal to N;
in response to determining that the duration of no touch operation being detected on the n-th touch screen reaches the preset duration, controlling the n-th touch screen to enter a screen-off state;
determining an application running on the n-th touch screen before the n-th screen enters the screen-off state;
releasing a resource occupied by the application; and
determining a type of the application running on the n-th touch screen before the n-th screen enters the screen-off state,
wherein the processor is configured to implement releasing the resource occupied by the application by:
releasing the resource occupied by the application according to the type of the application.

9. The device of claim 8,
wherein the resource comprises at least one of a bandwidth resource, a processing resource, or a storage resource.

10. The device of claim 9, wherein the type of the application comprises a first type having a resource download function,
wherein the processor is configured to implement releasing the resource occupied by the application according to the type of the application by:
in response to the type of the application being the first type, and the application of the first type being in a resource download state, retaining the storage resource and the bandwidth resource of the application of the first type, and releasing the processing resource of the application of the first type.

11. The device of claim 9, wherein the type of the application comprises a second type having a computing function,
wherein the processor is configured to implement releasing the resource occupied by the application according to the type of the application by:

in response to the type of the application being the second type, releasing the bandwidth resource, the processing resource, and the storage resource of the application of the second type.

12. The device of claim 8, wherein the processor is configured to implement recording the touch time of the touch operation by:
recording touch time of touch operations applied to the N touch screens according to identification information of the N touch screens,
wherein the processor is configured to implement, in response to determining that the duration of no touch operation being detected on the n-th touch screen reaches the preset duration, controlling the n-th touch screen to enter the screen-off state, by:
in response to determining that the duration of no touch operation being detected on the n-th touch screen reaches the preset duration, generating a screen control instruction according to identification information of the n-th touch screen; and
controlling the n-th touch screen to enter the screen-off state according to the screen control instruction.

13. The device of claim 12, wherein the processor is further configured to implement:
labeling, according to the identification information of the n-th touch screen, the resource occupied by the application running on the n-th touch screen before the n-th screen enters the screen-off state,
wherein the processor is configured to implement releasing the resource occupied by the application by:
releasing the resource that has been labeled.

14. The device of claim 8, wherein the processor is further configured to implement:
in response to determining that the duration of no touch operation being detected on the n-th touch screen does not reach the preset duration, keeping the n-th touch screen in the screen-on state.

15. A non-transitory computer-readable storage medium storing computer-executable instructions which, when executed by a processor, implement:
detecting a touch operation applied to one of N touch screens in a screen-on state, and recording touch time of the touch operation, wherein N is a positive integer greater than or equal to 2;
determining, based on a touch time of one last touch operation detected on an n-th touch screen of the N touch screens, whether a duration of no touch operation being detected on the n-th touch screen reaches a preset duration, wherein n is a positive integer less than or equal to N;
in response to determining that the duration of no touch operation being detected on the n-th touch screen reaches the preset duration, controlling the n-th touch screen to enter a screen-off state;
determining an application running on the n-th touch screen before the n-th screen enters the screen-off state; and
releasing a resource occupied by the application; and
determining a type of the application running on the n-th touch screen before the n-th screen enters the screen-off state, wherein when executed by the processor, the computer-executable instructions further implement releasing the resource occupied by the application by:
releasing the resource occupied by the application according to the type of the application.

16. The storage medium of claim 15,
wherein the resource comprises at least one of a bandwidth resource, a processing resource, or a storage resource.

17. The storage medium of claim 16, wherein the type of the application comprises a first type having a resource download function,
wherein when executed by the processor, the computer-executable instructions further implement releasing the resource occupied by the application according to the type of the application by:
in response to the type of the application being the first type, and the application of the first type being in a resource download state, retaining the storage resource and the bandwidth resource of the application of the first type, and releasing the processing resource of the application of the first type.

\* \* \* \* \*